July 10, 1956  C. L. DAY ET AL  2,753,975
COMBINER FOR CONTAINER CONVEYOR MECHANISM
Filed Jan. 8, 1953  3 Sheets-Sheet 1

INVENTOR
CARL L. DAY
FREDERICK E. FAUTH

BY *Cushman, Darby & Cushman*
ATTORNEYS

July 10, 1956 C. L. DAY ET AL 2,753,975
COMBINER FOR CONTAINER CONVEYOR MECHANISM
Filed Jan. 8, 1953 3 Sheets-Sheet 2

INVENTOR
CARL L. DAY
FREDERICK E. FAUTH

BY Cushman, Darby & Cushman
ATTORNEYS

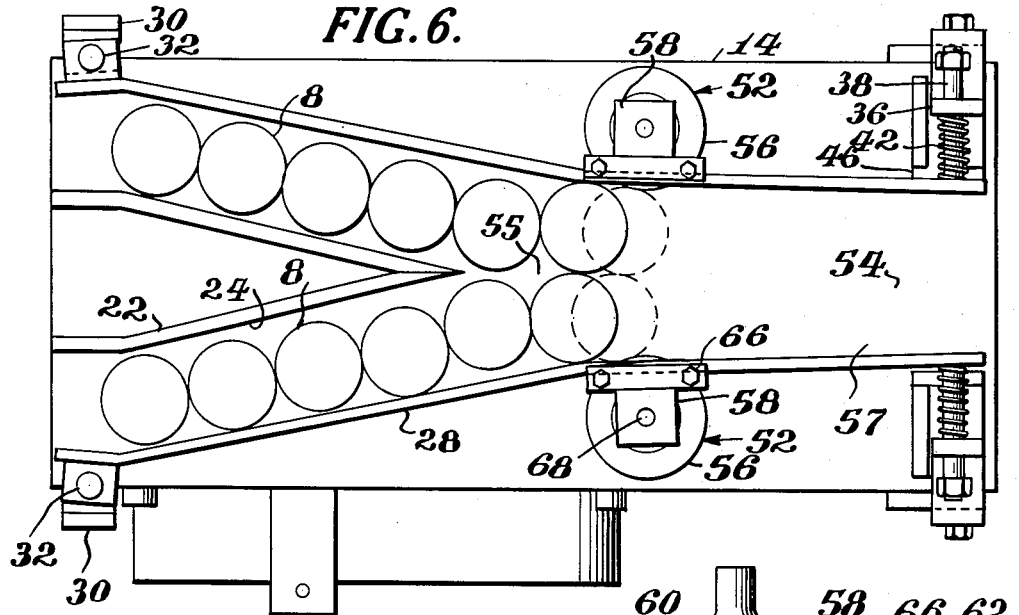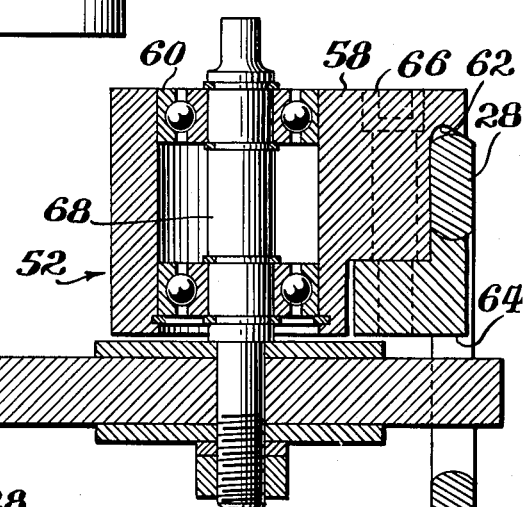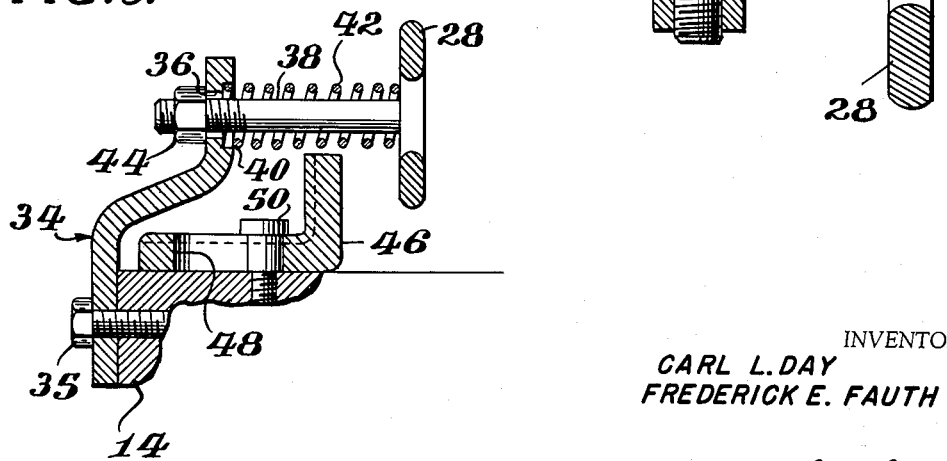

United States Patent Office 2,753,975
Patented July 10, 1956

2,753,975
COMBINER FOR CONTAINER CONVEYOR MECHANISM

Carl L. Day and Frederick E. Fauth, Baltimore, Md., assignors to Crown Cork & Seal Company, Inc., Baltimore, Md., a corporation of New York Application January 8, 1953, Serial No. 330,252

17 Claims. (Cl. 198—32)

The present invention relates to a conveyor combiner mechanism, and more particularly, to a conveyor combiner mechanism for combining a plurality of lines of articles from an infeed conveyor structure onto an outfeed conveyor.

An object of the invention is to provide an arrangement for combining a plurality of rows of substantially cylindrical articles, for example, soft drink, beer, or milk bottles and cans into a single row.

The conveying of bottles and cans or the like from filling machines to case loaders presents a problem of preventing scuffing and marring the containers when combined from a plurality of rows to a single row.

Another object of the present invention is to provide a conveyor combiner mechanism which is essentially scuffless. In other words, the present invention is intended to eliminate rough handling of the containers during the combining operation and, thus, the replacement costs of containers are materially reduced.

Another object of the present invention is to provide a conveyor combiner mechanism which is essentially free from jamming, even if two articles enter the combiner from separate rows at the same instant.

Ancillary to the above object, the present invention provides a conveyor combiner mechanism in which complicated timing mechanisms for timing the arrival of articles from separate lines to a single outfeed line are eliminated. By providing a mechanism which is essentially free from complicated switch mechanisms or star wheels which alternately feed units to the outfeed conveyor, maintenance problems are eliminated and manufacturing costs are reduced.

A still further object of the invention is to provide a conveyor combiner mechanism which will operate in accordance with the supply of articles from a plurality of rows to combine them into a single row. By providing a conveyor combiner mechanism which operates in accordance with the supply of articles by the infeed conveyors rather than on alternate feed mechanisms, the present conveyor combiner mechanism will operate to combine a maximum number of articles per minute into a single row. Thus, the speed of operation of the filling machines and case loaders, or the like, may be the determining factor in transferring and combining articles from one place to another rather than the speed with which the combiner could combine articles from separate infeed lines into a single row.

These and other objects of the invention will appear more clearly from the following specification, claims and drawings in which:

Figure 6 is a plan view similar to Figure 1, but showing the conveyor combiner mechanism at the instant articles enter in side by side relationship and further showing a modification of Figure 1 in that two anti-friction means are disclosed;

Figure 7 is an enlarged fragmentary cross-sectional view of the anti-friction means showing it mounted on the guide rails;

Figure 8 is an enlarged fragmentary cross-sectional view of the resilient means for urging the guide rails toward each other.

Figure 1:
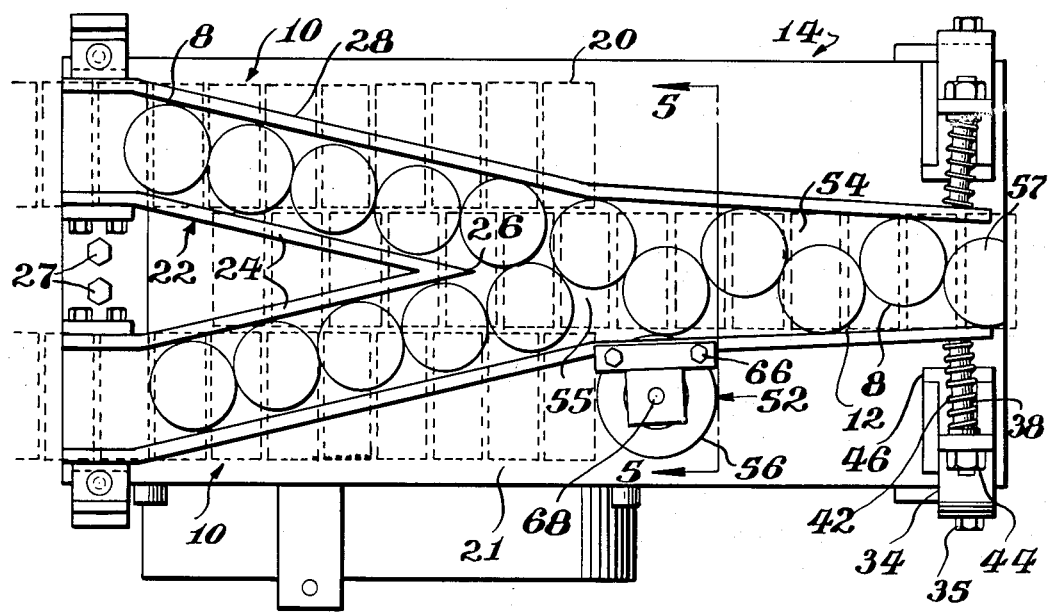
Figure 1 is a plan view of the conveyor combiner mechanism in normal operating condition and showing articles being combined into a single row.

Referring specifically to the drawings wherein like character or reference numerals represent like or similar parts, the container combiner mechanism is for combining rows of articles 8 travelling on an infeed conveyor structure 10, into a single row of articles on an outfeed conveyor 12. The embodiment of the invention disclosed herein is intended for use in a bottling plant or the like, for example, where articles are fed from a plurality of filling machines to a case loader and in the course of transferring the articles from the filling machines, it is necessary that the articles be combined into a single row so that they may be fed into the case loader for crating or boxing. Other uses in bottling plants or the like is of course within the scope of the invention, and it may be generally stated that the device may be used wherever it is necessary to combine articles into a single line.

Figure 2:
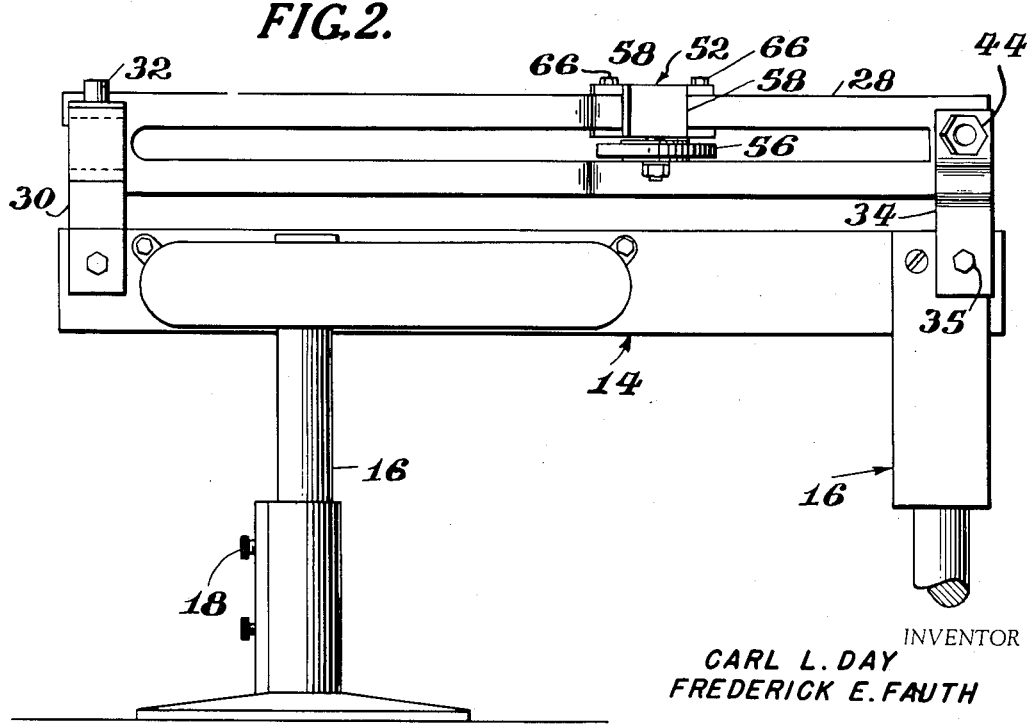
Figure 2 is a side elevational view of the conveyor combiner mechanism disclosed in Figure 1.
Figure 3:
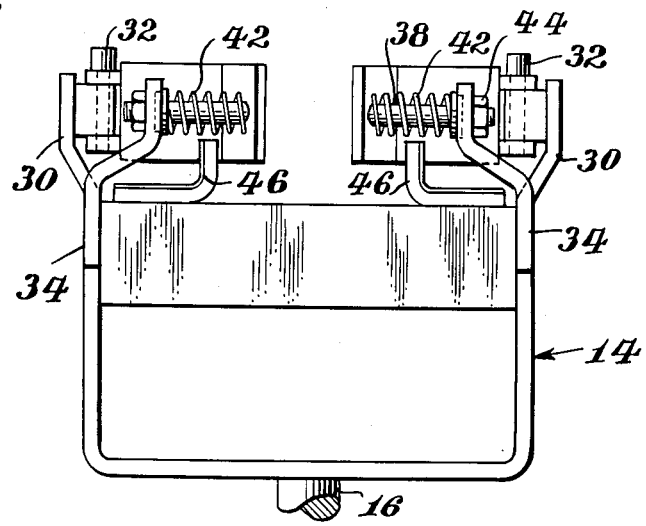
Figure 3 is an end view of the conveyor combiner mechanism looking toward Figure 1 from the right.

As shown in Figures 1 and 2, the frame 14, which supports the combining mechanism, may be interposed into the conveyor lines and is provided with means for receiving infeed conveyor structure 10 and outfeed conveyor 12. Frame 14 is provided with supporting legs or pedestals 16 which may be adjusted for various heights by means of the adjusting screws 18 to accommodate the combiner mechanism for operation with existing conveyor lines within a plant.

In Figure 1 conveyor structure 10 is disclosed as being two flat-top and endless type of infeed conveyors 20 and 21. It will be understood that infeed conveyor structure 10 could be a single conveyor having separate trackways. Outfeed conveyor 12 is also an endless type flat-top conveyor such as commonly used in bottling plants. Under certain conditions, conveyors 10 and 12 could be one wide common conveyor. Suitable idler sprocket means are provided within frame 14 for receiving the aforementioned infeed and outfeed conveyors.

Mounted on the frame 14 adjacent the infeed conveyors 20 and 21 is a center guide element 22 which has lateral sides or surfaces 24 converging toward the outfeed conveyor 12. The apex end 26 of wedge-shaped center guide element 22 is positioned over outfeed conveyor 12. Suitable means such as bolts 27 may be provided for rigidly attaching center guide element 22 to frame 14.

Figure 4:
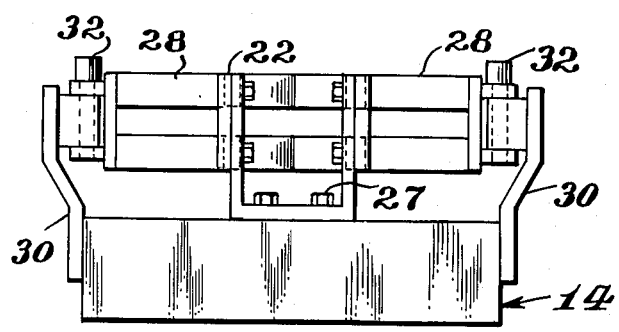
Figure 4 is an end view of the conveyor combiner mechanism looking toward Figure 1 from the left.

Also mounted on frame 14, for pivotal movement therewith, are a pair of diametrically opposite outer guide rails 28 which define the path of the articles from the infeed to the outfeed conveyors. Guide rails 28 are mounted on the frame 14 by means of a pivot bracket 30 to which the guide rails are freely pivoted at 32. As shown in Figure 4 the guide rails 28 will pivot about the vertical pivot 32 in a plane transverse the infeed and outfeed conveyors.

It will be noted from Figure 1 that guide rails 28, in a normal operating position, will be parallel to and spaced from lateral surfaces 24 of guide element 22 to a point forward of apex end 26, at which point, guide rails 28 will converge along the sides of outfeed conveyor 12 to their terminal ends. The distance between lateral surfaces 24 of guide element 22 and that portion of guide rails 28, which are parallel thereto, is sufficient for clearance of the type of article being transferred. On the other hand, the area between the portions of guide rails 28, which extend along each side of outfeed conveyor 12, forms a throat portion 54 having a mouth 55 and a discharge end 57.

At the terminal end of each of the guide rails 28, means are provided for urging the pivotal guide rails toward each other to a position determined by existing operating conditions. As shown in Figure 8, the means for urging guide rails 28 toward each other consists of a bracket 34 rigidly connected to frame 14 by means of a bolt 35, and having a hole or bore 36 in the upper end thereof. Hole or bore 36 is provided with an enlarged counterbore 40, open on the inner side of bracket 34. A bolt or stud 38 rigidly secured to the terminal ends of guide rails 28 is adapted to be received in the hole in bracket 36, and is surrounded by a coil spring 42 which has one end bearing against guide rails 28 and the other end positioned within counterbore 40. Spring 42 will lightly hold the guide rails 28 in the normal operating position shown in Figure 1. In order that bolt or stud 38 may be detachably connected to bracket 34 and limit the inner movement of the guide rail, a nut 44 is threaded onto the end of the bolt. Nut 44 also provides an adjustment for limiting the inner movement of guide rails 28 as operating conditions for a particular situation demand. To limit the outer movement of guide rails 28, an adjustable stop 46 is provided which is L shaped in cross-section and which has an elongated slot 48 in one leg thereof, through which bolt 50 is passed to rigidly secure it to the frame. The purpose of stop 46 which limits the outward movement of the guide rails 28 will be explained in more detail later in the specification.

Figure 5:
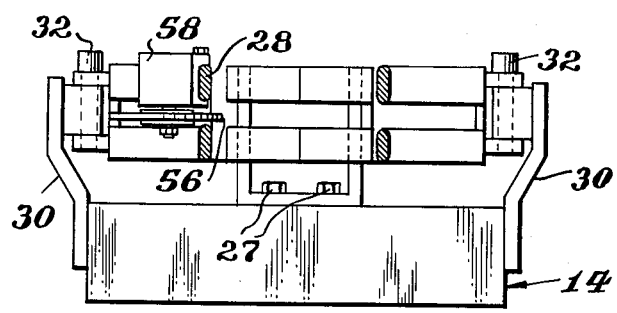
Figure 5 is a cross-sectional view taken on the line 5—5 of Figure 1.

As shown in Figures 1, 5 and 6, if conditions of container surface require it, one or more anti-friction means 52 are provided at mouth 55 of the throat portion 54 of the combiner. Referring specifically to Figure 7, anti-friction means 52 includes suitable clamping means adapted to clamp onto guide rails 28 and a frictionless wheel or roller 56 mounted in suitable bearings. A bearing housing 58 which supports roller bearings 60 or the like is provided with a cut-out portion 62 which is adapted to a clamp over guide rail 28. A clamping block 64 is adapted to engage the lower side of guide rail 28 and is held in clamping engagement therewith by means of a clamping bolt 66. Bearings 60, supported in bearing housing 58, are adapted to receive a shaft 68 on which is mounted frictionless roller or disc 56. As will be noted from Figure 7, disc 56 will extend within the throat portion of the combiner a sufficient distance to engage the side of an article being transferred through the combiner.

In operation, the conveyor combiner mechanism receives articles 8 such as bottles or the like, from conveyor trackways leading from various filling machines or other mechanisms. The articles 8 enter the combiner on the infeed conveyors and are converged toward each other through the necessary closed path by guide rails 28. After the articles pass apex end 26 of center guide element 22, they are combined in a single row on outfeed conveyor 12. It might be mentioned at this point that outfeed conveyor 12 for container spacing reasons, should, though not necessarily, travel at a speed faster than infeed conveyors 20 and 21 and it has been found that the speed of the outfeed conveyor should be approximately 2.2 times that of the infeed conveyors. After articles enter the combining mechanism, usually at random as disclosed in Figure 1, they are gradually forced by a slight side pressure of guide rails 28 toward the center of outfeed conveyor 12 and in staggered relationship to each other. However, should two articles enter throat portion 54 of the combiner abreast, or substantially so, guide rails 28 will pivot away from each other. In more detail, the guide rails are pivoted away from each other against the action of springs 42, which tend to return the rails to their normal operating position. Because springs 42 are very light, there will only be a slight increase of side pressure on the articles and this increase is just sufficient to momentarily hold the articles. When the articles are thus detained, the outfeed conveyor 12 will slide under them, so that the question of which article becomes the leading article will primarily depend upon the pressure of succeeding containers in the respective infeed lines. Since the possibility of pressure in the two lines being equal is practically zero, one container or article will always move ahead because of unequal line pressure, thus, clearing the momentary stoppage and allowing guide rails 28 to return to their normal operating position.

It will be noted from Figure 6 that the outward travel of guide rails 28 is limited by means of stop 46 and under no condition will the width of the mouth of the throat portion 54 be equal to or greater than the width of two containers positioned side by side. As will be noted from Figure 1, in the normal operating position the width of the mouth of the throat portion of the combiner is substantially less than the width of two articles positioned side by side, whereas the discharge end of the throat portion 54 is slightly greater than the width of a single article. To obtain the above mentioned desired conditions, we have found, for example, that the included angle between the lateral surfaces of the center guide element 24 may be approximately 26° while the included angle between the forward portion of guide rails 28 adjacent the infeed end thereof in their normal operating position also may be approximately 26°. On the other hand, the included angle between the guide rails adjacent the throat portion of the combiner may be approximately 6°. The pivoted position of guide rails 28 changes the included angle adjacent the center guide element to approximately 20° whereas the included angle of the portion of the guide rails adjacent the throat portion of the combiner will change to approximately 3°.

To further insure the combining mechanism will not jam under adverse operating conditions, such as with rough or high surface friction glass, we have provided it with anti-friction means 52 whereby articles will combine with less scuffing and no jamming. As shown in Figure 1, the anti-friction device may be mounted on only one guide rail, at the mouth of throat portion 54 so that the friction on the articles contacting the anti-friction means will be decreased to a minimum and is less than the friction on an adjacent article in the other infeed row and thus with very little line pressure a jam can be avoided. The combiner will always provide an easement for the line contacting the anti-friction means, over articles in the other line.

As shown in Figure 6 we have found that under some operating conditions it is necessary to have an anti-friction means mounted on each of the guide rails, opposite one another. In this instance, the friction on the articles is reduced to a minimum in both lines and the clearance of a momentary stoppage is similar to that described above where anti-friction means are not provided. In this instance, the line with the most articles and greatest line pressure will be provided with an easement over articles in the other line to relieve momentary stoppage.

Operating conditions of a particular situation may require that the anti-friction means be positioned at various points longitudinally along the guide rails. With this in mind, the anti-friction means are made for clamping engagement with the guide rails, so that they can be adjusted longitudinally at points on the rails. However, it is found that in most conditions, the anti-friction means should be positioned adjacent the throat portion of the combining mechanism.

It has also been found that in normal operation of the combining mechanism of the present invention, the articles will enter in staggered relationship ninety-nine per cent of the time and thus they encounter no resistance to flow. Consequently the combining mechanism is essentially scuffless. In instances where the articles hesitate momentarily, due to the condition of two articles entering the combiner side by side, the light flexing of the pivoted guide rails will relieve the condition and still handle the articles gently.

It is within the contemplation of the present invention to make the combiner adjustable for different size articles. This adjustment may be made by making the brackets 30 and 34 adjustable so that either a larger or smaller throat portion may be obtained as desired.

The terminology used in this specification is for the purpose of description and not of limitation, the scope of the invention being defined in the claims.

We claim:

1. A conveyor combiner mechanism for distributing a plurality of lines of articles from an infeed conveyor structure onto an outfeed conveyor, comprising a center guide element including lateral surfaces converging toward the outfeed conveyor, and converging guide rails arranged to be relatively movable outwardly and away from said center guide element and each other, said guide rails normally lying substantially parallel to and spaced from said lateral surfaces of said guide element to a point forward of the discharge end of the latter and extending forwardly from such point along each side of the outfeed conveyor to define a throat portion for combining articles received from the infeed conveyor structure said guide rails being movable outwardly and away from said center guide element and each other when a plurality of articles enter said throat portion substantially side by side, and means to limit the outward movement of said guide rails.

2. A conveyor combiner mechanism of the character described in claim 1 wherein said throat portion has a mouth of a width less than the width of two of the articles positioned side by side and the discharge end thereof has a width slightly greater than the width of one of the articles.

3. A conveyor combiner mechanism of the character described in claim 1 including anti-friction means facing into said throat portion at a point adjacent one of said guide rails whereby jams are prevented when articles enter said throat portion side by side.

4. A conveyor combiner mechanism for distributing a plurality of lines of articles from an infeed conveyor structure onto an outfeed conveyor, comprising a support for said infeed conveyor structure and outfeed conveyor, a center guide element rigidly mounted on said support and including lateral surfaces converging toward the outfeed conveyor, converging guide rails arranged to be relatively movable with respect to said center guide element, said guide rails normally lying substantially parallel to and spaced from said lateral surfaces of said guide element to a point forward of the discharge end of the latter and extending forwardly from such point along each side of the outfeed conveyor to define a throat portion for combining articles received from the infeed conveyor structure, and means to urge said guide rails toward each other.

5. A conveyor combiner mechanism of the character described in claim 4 wherein said guide rails are pivotally mounted adjacent the infeed conveyor structure and said means to urge the guide rails toward each other is a spring.

6. A conveyor combiner mechanism of the character described in claim 4 wherein said means for urging said guide rails toward a normal operating position include springs mounted on said frame at the discharge end of said throat portion and engaging said guide rails.

7. A conveyor combiner mechanism for combining rows of articles from two infeed conveyors into a single row of articles on an outfeed conveyor, comprising a support for the infeed and outfeed conveyors, a center guide element rigidly mounted on said support and having lateral surfaces converging from a position adjacent the infeed conveyors to an apex end disposed toward and over the outfeed conveyor, two guide rails pivotally connected to said support adjacent the infeed conveyors and extending parallel to and spaced from said lateral surfaces of said guide element to a point forward of the apex end of the latter and converging from such point along said outfeed conveyor to define a throat portion for combining the articles into the single row, said throat portion including a mouth and a discharge end, and means normally urging said pivotal guide rails toward each other wherein said mouth of said throat portion has a width less than the width of two of the articles positioned side by side and said discharge end thereof has a width slightly greater than the width of one of the articles.

8. A conveyor combiner mechanism of the character described in claim 7 including means to limit the movement of said guide rails away from each other so that said throat portion has a mouth of a maximum width slightly less than the width of two of the articles positioned side by side.

9. A conveyor combiner mechanism for combining rows of articles from two conveyors into a single row of articles on an outfeed conveyor, comprising a wedge-shaped element positioned between the two infeed conveyors and having the apex end thereof disposed toward the outfeed conveyor, two oppositely disposed pivotal guide rails, said guide rails parallel to and spaced from each side of said wedge-shaped member to a point forward of the apex end of the latter and then converging along each side of the outfeed conveyor to define a throat portion for combining the rows of articles received from the infeed conveyors into a single row of articles, and means for resiliently urging said pivotal guide rails toward each other.

10. A conveyor combiner mechanism for combining rows of articles from two infeed conveyors into a single row of articles on an outfeed conveyor, comprising a wedge-shaped member positioned between the two infeed conveyors and having the apex end thereof disposed toward the outfeed conveyor, two oppositely disposed outer guide rails, a portion of each of said guide rails spaced from and substantially parallel to each of the sides of said wedge-shaped member, another portion of each of said guide rails extending from said first portion along the outfeed conveyor to define a throat portion wherein said articles are combined into a single row, and anti-friction means mounted on at least one of said outer guide rails in said throat portion whereby jams are prevented when the articles enter said throat portion side by side.

11. A conveyor combiner mechanism of the character described in claim 10 wherein said anti-friction means is mounted on said guide rails adjacent the mouth of said throat portion.

12. A conveyor combiner mechanism of the character described in claim 10 wherein said anti-friction means is adjustable longitudinally of said guide rails.

13. A conveyor combiner mechanism of the character described in claim 10 wherein said anti-friction means include a frictionless roller mounted for engagement with the article.

14. A conveyor combiner mechanism of the character described in claim 10 wherein said anti-friction means are mounted on each of said guide rails and are oppositely disposed from each other.

15. A conveyor combiner mechanism for combining rows of articles from two infeed conveyors into a single row of articles on an outfeed conveyor, comprising a center guide element including lateral surfaces converging toward the outfeed conveyor, two oppositely disposed pivotal guide rails, said guide rails being parallel to and spaced from each of said lateral surfaces of said guide element to a point forward of the apex end of the latter and then converging from such point along each side of the outfeed conveyor to define a throat portion for combining articles received from the infeed conveyors, said throat portion including a mouth and a discharge end, means to resiliently urge said pivotal guide rails toward each other to a normal operating position, and means to limit the movement of said guide rails away from each other so that said throat portion has a mouth of a maximum width slightly less than two of the articles positioned side by side.

16. A conveyor combiner mechanism for distributing a plurality of lines of articles travelling on a conveyor into a single line of articles, comprising a center guide element including lateral surfaces converging toward each other in the direction of movement of the conveyor, and converging guide rails arranged to be relatively movable outwardly and away from said center guide element and each other, said guide rails normally lying substantially parallel to and spaced from said lateral surfaces of said guide element to a point forward of the discharge end of the latter and extending forwardly from such point along each side of the conveyor to define a throat portion for combining the plurality of lines of articles into the single line of articles, said guide rails being movable outwardly and away from said center guide element and each other when a plurality of articles enter said throat portion substantially side by side, and means to limit the outward movement of said guide rails.

17. A conveyor combiner mechanism for distributing a plurality of lines of articles travelling on a conveyor into a single line of articles, comprising a center guide element including lateral surfaces converging toward each other in the direction of movement of the conveyor, two oppositely disposed outer guide rails, a portion of each of said guide rails spaced from and substantially parallel to each of the lateral surfaces of said center guide element, another portion of each of said guide rails extending from said first portion along the conveyor to define a throat portion wherein said lines of articles are combined into a single line of articles, and anti-friction means mounted on at least one of said outer guide rails in said throat portion whereby jams are prevented when the articles enter said throat portion side by side.

References Cited in the file of this patent

UNITED STATES PATENTS

| | | |
|---|---|---|
| 405,088 | Ferguson | June 11, 1889 |
| 1,826,832 | Sekulski | Oct. 13, 1931 |
| 2,108,522 | Bergmann | Feb. 15, 1938 |